United States Patent [19]

Spezio

[11] Patent Number: 4,634,230

[45] Date of Patent: Jan. 6, 1987

[54] MULTI DIMENSIONAL INSTANTANEOUS OPTICAL SIGNAL PROCESSOR

[75] Inventor: Anthony E. Spezio, Laurel, Md.

[73] Assignee: The United States of America as represented by the Secretary of the Navy, Washington, D.C.

[21] Appl. No.: 576,834

[22] Filed: Feb. 3, 1984

[51] Int. Cl.$^4$ .......................... G02F 1/33; G01S 13/72
[52] U.S. Cl. .................................... 350/358; 364/822; 342/54
[58] Field of Search ..................... 350/358; 367/149, 8; 343/9 PS, 17; 364/819, 822, 821, 604

[56] References Cited

U.S. PATENT DOCUMENTS

| | | | |
|---|---|---|---|
| 4,114,116 | 9/1978 | Reeder | 364/821 |
| 4,124,280 | 11/1978 | Berg et al. | 350/358 |
| 4,204,262 | 5/1980 | Fitelson et al. | 364/822 |
| 4,297,704 | 10/1981 | Marom et al. | 350/96.13 |

OTHER PUBLICATIONS

Publication: ASILIMAR Conference, 1978, Spezio, 6–8, Nov. 1978.

Primary Examiner—William H. Punter
Attorney, Agent, or Firm—Sol Sheinbein; William T. Ellis

[57] ABSTRACT

A 3 or more - dimensional optical processor for simultaneously processing three or more parameters from a coherent emitter via an acoustic Bragg cell. For a 3-D processor, two separate antenna arrays (azimuth and elevation) are connected to excite two sets of acoustic transducer arrays on one edge of the Bragg cell. Multiplexing is achieved by the appropriate choice of the transducer array apertures. One transducer array set may have a narrow aperture to produce one wide first grating lobe pattern or a fraction thereof in a given focal plane (nonredundant imaging). The other transducer array set may have a wider transducer array aperture to produce a plurality of smaller second grating lobes within the first grating lobe pattern in the focal plane (redundant imaging). One coordinate axis of the focal plane represents the frequency of the emitter. The other coordinate provides the elevation parameter for that frequency emitter by measuring the position of the non-redundant lobe relative to the center boresight axis. The azimuth parameter is then obtained for that frequency emitter by measuring the position of the small redundant lobe closest to the centroid of the nonredundant lobe relative to its null position for that particular redundant lube.

16 Claims, 16 Drawing Figures

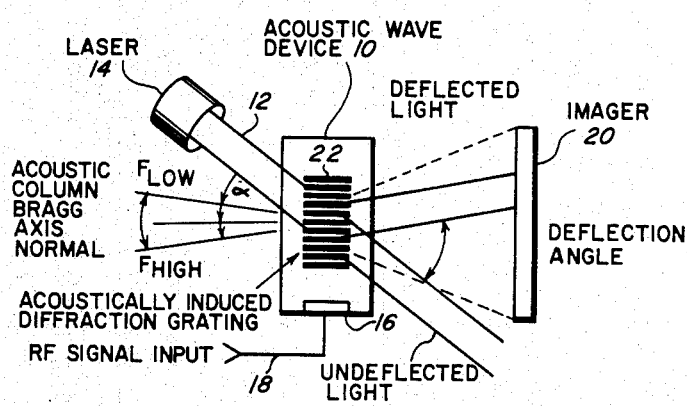
PRIOR ART
FIG. 1
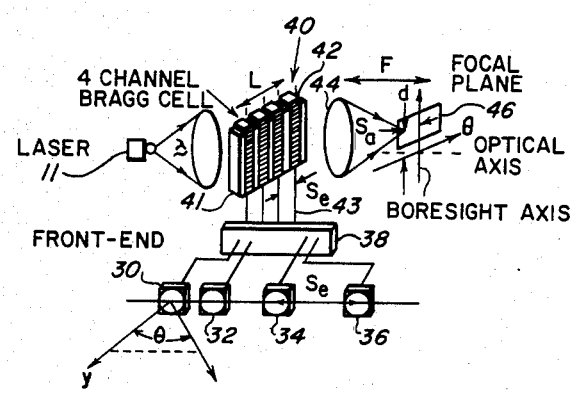
PRIOR ART
FIG. 2
PRIOR ART
FIG. 3(a)
PRIOR ART
FIG. 3(b)
PRIOR ART
FIG. 4

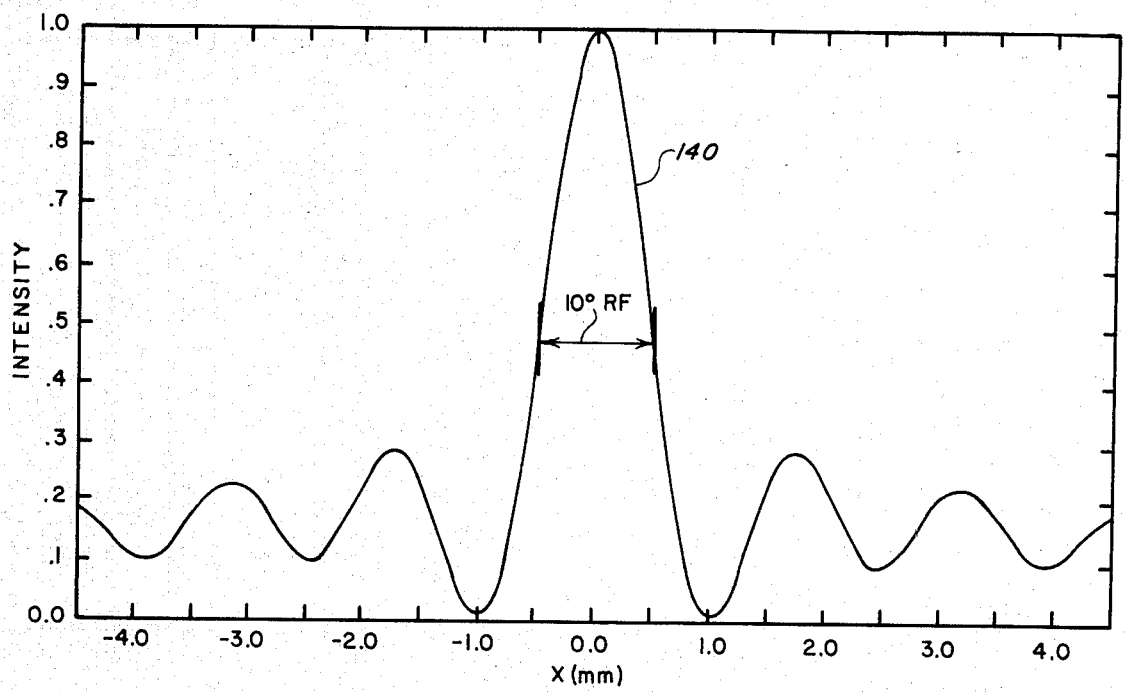
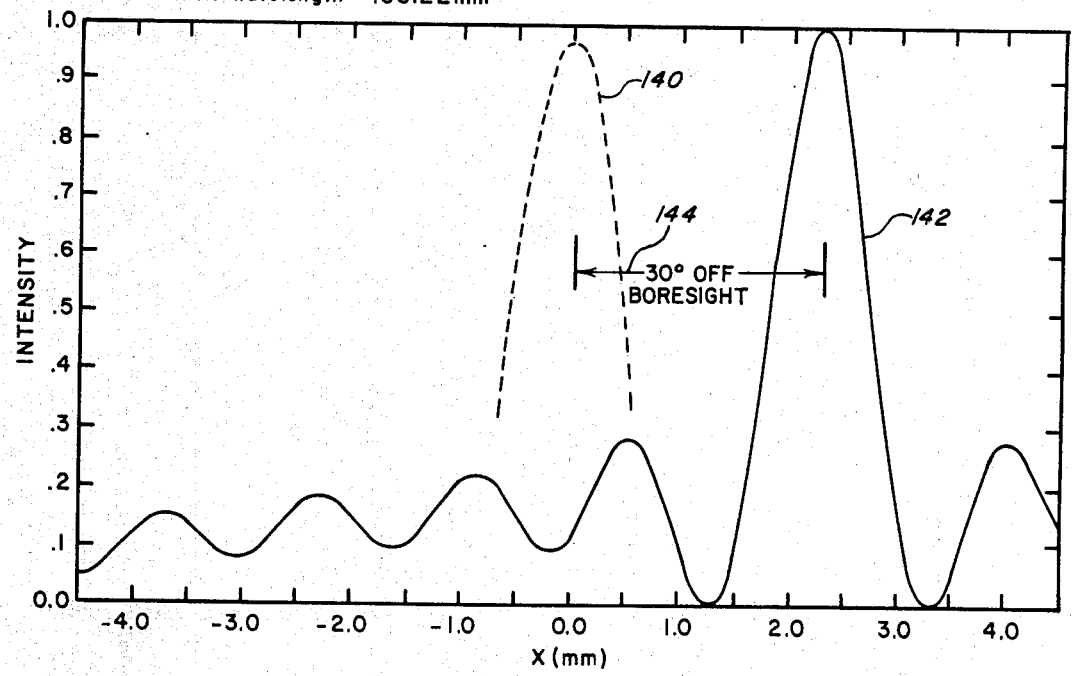

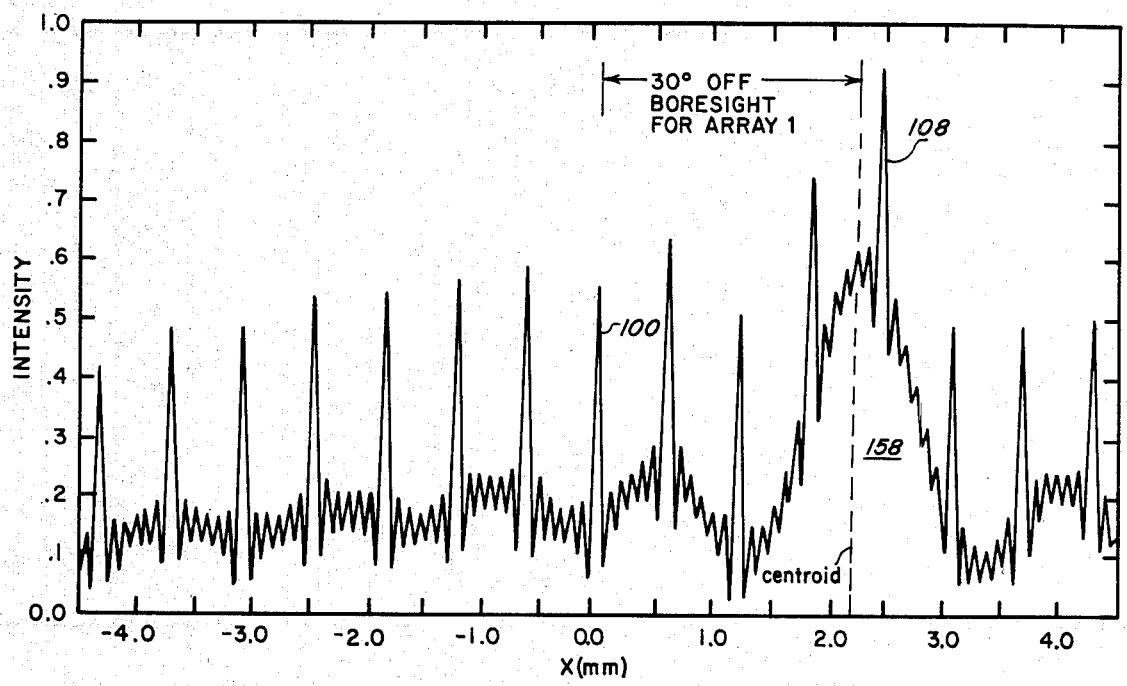

FIG. 13

INCOHERENT SUM
Transducer width = .04mm
Optical wavelength = .00082mm
Focal length = 750mm
Array 2 positions (mm):
  0.00  1.00  4.00  6.00
Array 2 angle = 0 degrees
Acoustic wavelength = .00122mm Array 1 positions (mm):
  2.80  2.87  3.07  3.20
Array 1 angle = 30 degrees

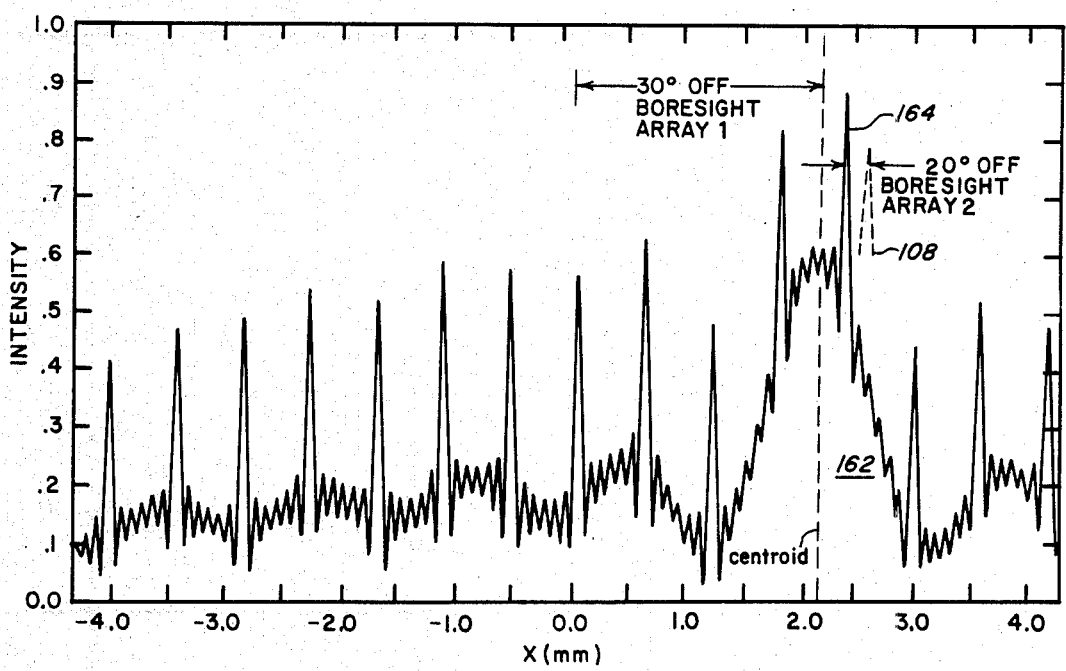

FIG. 14

INCOHERENT SUM
Transducer width = .04mm
Optical wavelength = .00082mm
Focal wavelength = 750mm
Array 2 positions (mm):
  0.00  1.00  4.00  6.00
Array 2 angle = 20 degrees
Acoustic wavelength = .00122mm Array 1 positions (mm):
  2.80  2.87  3.07  3.20
Array 1 angle = 30 degrees

MULTI DIMENSIONAL INSTANTANEOUS OPTICAL SIGNAL PROCESSOR

BACKGROUND OF THE INVENTION

The present invention relates generally to simultaneous multiple dimension signal processing, and more particularly to simultaneous optical multiple-dimension signal processing.

Multiple-dimension instantaneous optical signal processors perform instantaneous measurements of signal parameters associated with applied radio frequency signals. In the prior art, multi-dimensional signal parameter measurements are made independently on a narrow band basis. Such instantaneous parameters as frequency bearing, elevation, polarization, etc., are measured by parallel receiving circuits. Accordingly, the number of receivers and processors required to perform multiple parameter analysis is significant.

One prior art technique has been developed for performing one-dimensional optical signal processing. This technique utilizes an elementary form of an acousto-optic processor based upon Bragg optical deflection. An elementary acousto-optic processor is shown in FIG. 1. The basic feature of this processor involves the interaction of acoustic energy propagating in an elastic, optically transparent medium 10 illuminated by coherent light 12 from a laser source 14. The optically transparent medium 10 is an acoustic wave device which acts as the deflection element (Bragg cell) and includes an attached transducer coupler 16 at one end thereof. In operation, RF signals on line 18 from the environment are coupled via the transducer 16 into the acoustic wave device 10. The transducer 16 acts to propagate the RF signal in the acoustic wave device in the form of an acoustic wave which alternately compresses and then expands the material in the acoustic wave device, as it propagates in one direction. This density modulation occurs at the RF drive frequency on line 18 and causes local changes in the index of refraction, thereby inducing an optical diffraction grating in the material. When this defraction grating is illuminated at a precise angle, the Bragg angle from the normal to the direction of acoustic propagation, then optical reinforcement occurs and some of the incident light is deflected onto a given focal plane 20 at an angle proportional to the acoustic frequency. That is the incident and exit angle α of the light relative to a perpendicular to the acoustic column 22 is $$\alpha \approx \text{SIN}^{-1} \frac{\lambda}{2\Lambda}, \text{ for } \Lambda \gg \lambda,$$

where λ is the light wave length and Λ is the acoustic wavelength. Since the Bragg angle α is a function of the acoustic wavelength Λ, a change in frequency at the RF input line 18 will change the physical dimension of the acoustic wavelength Λ and result in a new deflection angle α and a new location on the focal plane 20. Note that since the light source 14 has a narrow beam width, the range of angles and corresponding radio frequencies over which the conditions for Bragg angle deflection are met (the bandwidth) is determined by the acoustic angular beamwidth, i.e., the width of the grating pattern 22 generated by the acoustic transducer. A wide bandwidth acousto-optic processor will act to separate overlapping frequency signals into a number of different deflected optical beams each representing the spectral characteristics of the applied signal or signals. In essence, since the Bragg angle is a function of the acoustic-wavelength, signals applied at different frequencies result in a spatially diverse optical deflection on the focal plane 20.

The acousto-optic processor of FIG. 1 is a one-dimensional processor for processing frequency. The acousto-optical processor may be extended to a second dimension by the use of a planar acousto-optic acoustic wave device and by using a focal plane sensor with a two-dimensional detector array. Such a two-dimensional processor is shown in FIG. 2. One application of this device, frequently referred to as a phase interferometer acousto-optic processor, is described in more detail in the article by A. E. Spezio, entitled "Acoustooptics for Electronic Warfare Applications", "The Proceedings at the 12th Asilomar Conference on Circuits, Systems, and Computers", Nov. 6–8, 1978. The device comprises a planar acoustic wave device 40 with a set of multiple transducers 45 linearly positioned on one edge of the acoustic wave device 40 (See FIG. 3. Note that only the input lines 43 thereto are shown in FIG. 2.). In this example, the RF signal inputs from an antenna array such as, for example, an azimuth antenna array, comprising the antenna elements 30, 32, 34, and 36 are applied through a front end circuit 38 typically comprising standard circuitry for demultiplexing and converting the incoming RF signal to the IF frequency of the acoustic wave device 40. The signals from the front end circuit 38 separately drive via lines 43 the aforementioned transducers on the edge 41 of the acoustic wave device 40. The signals applied to the transducers induce four planar optical diffraction gratings 42 propagating upward in the figure. The entire Bragg cell acoustic wave device 40 is then coherently illuminated with laser source 11 so that laser light propagates into and through the broad planar face of the Bragg acoustic wave device 40 at the Bragg angle. The deflected light output is focused via a lens 44 onto a two-dimensional focal plane 46. This two-dimensional focal plane may be a two-dimensional detector array.

If all of the RF transducers on the edge 41 of the acoustic wave device 40 are excited with in-phase signals, representing a target emitter directly on boresight for the antenna array, then the compressions and extensions caused by the acoustic wave may be represented by the illustration of FIG. 3 (a). With this type of boresight in-phase excitation, deflection of the light occurs as a point only along the vertical axis in the focal plane. This deflection is represented by the vertical boresight line 50 in the focal plane shown below FIG. 3 (a).

However, if the target emitter is located at some off-boresight angle, then there is a linear phase variation across the RF signals applied to the transducers 45. These phase differential RF signals induce segmented planar diffraction gratings across the face of the acoustic wave device 40 such as that shown in FIG. 3 (b). A phase gradient relative to the input transducer edge then results. When these segmented planar diffraction gratings are coherently illuminated by the laser source 14, optical deflection occurs both along the vertical frequency axis 50 and along the horizontal phase axis 52. This type of deflection is represented in the focal plane 20 shown below FIG. 3 (b). In essence, the vertical deflection in the focal plane results from the vertical separation of the diffraction grating lines in the acoustic wave device and indicates the input frequency. The horizontal deflection results from equivalent horizontal separation of the diffraction line gratings and indicates a direction of arrival.

FIG. 4 represents a two-dimensional CRT display of a visual focal plane analysis obtained from a 2D digital processor. In this figure, the direction of arrival in relation to the antenna boresight is indicated by the position of the highest intensity lobe illumination, while the frequency is indicated by the position of the deflection along the frequency axis 62. In this example, three signals are simultaneously applied to the processor. The upper signal is the image of a 1 $\mu$sec pulsewidth, 5 kHz repetition rate 1st pulse train on antenna boresight. The boresight position is shown by the location of the highest intensity lobe 60 on the azimuth axis 66 for a first frequency excitation. The lower two signals are continuous wave signals separated by 75 MHz at an angle of 22° off of boresight. The main lobes 64 and 65 for these second and third frequencies are positioned a predetermined amount from the boresight axis 62 to indicate this 22° angle off of boresight.

Note that the above described acousto-optic processor provides the combined advantages of a very wide spectral band coverage with all of the advantages of narrow band signal analysis. This processor can instantaneously channelize incoming signals in both frequency and one direction of arrival parameter. This wideband real-time signal processing is a major advantage over the prior art.

At the present time, there is no known technique in the art for designing a three or more dimensional acousto-optical processor. In view of the number of parameters involved in signal analysis, i.e. frequency, bearing, elevation, polarization, etc., this type of limitation is a major handicap to system design.

OBJECTS OF THE INVENTION

Accordingly, it is an object of the present invention to provide a system for achieving simultaneous three or more dimensional acousto-optical signal processing.

It is a further object of the present invention to process multiple signal parameters in real time using optics as the processing medium.

It is yet a further object of the present invention to provide a system for instantaneous wide bandwidth multi-dimensional optical processing which can concurrently make high resolution spectral and spatial measurements.

It is a further object of the present invention to extract and sort multiple simultaneous overlapping signals from a given signal environment.

It is yet a further object of the present invention to significantly reduce the digital processing complexity of multiple parameter processor designs.

Other objects, advantages, and novel features of the present invention will become apparent from the detailed description of the invention, which follows the summary.

SUMMARY OF THE INVENTION

Briefly, the present N-dimensional instantaneous optical signal processor comprises apparatus for providing N-1 parameter sets of input signals at appropriate intermediate frequencies; a focal plane structure; and apparatus for modulating the information from the N-1 parameter sets onto coherent light and coherently summing this modulated light on the focal plane structure. The modulating apparatus comprises N-1 modulating and imaging circuits including a first modulating and imaging circuit for modulating a first parameter set of the N-1 parameter sets and imaging it in the form of a first pattern on the focal plane structure. The modulating apparatus further includes a second modulating and imaging circuit for modulating a second parameter of the N-1 parameter sets and imaging it redundantly in the form of a second pattern within the first pattern in the focal plane structure. The nth modulation and imaging circuit modulates the nth parameter set of the N-1 parameter sets onto the optical beam and images it redundantly in the form of an nth pattern within the n-1th pattern on the focal plane device, where $3 \leq n \leq N-1$.

In a preferred embodiment of the present invention, the first modulating and imaging circuit images the first pattern non-redundantly on the focal plane structure. The modulating apparatus comprises an essentially optically transparent acoustic wave device, and structure for applying coherent light to the acoustic wave device at approximately the Bragg angle. Application of coherent light at the Bragg angle causes a portion of the coherent light to be deflected onto the focal plane structure at an angle proportional to the applied frequency propagating within the acoustic wave device.

In a more detailed embodiment of the present invention, each of the N-1 modulating and imaging circuits comprises a set of transducers disposed linearly on an edge of the acoustic wave device for generating an optical diffraction grating in the acoustic wave device. Each set of transducers is driven by a different predetermined input signal set from the N-1 parameter sets. Each set of transducers has a different predetermined total aperture spacing for generating broadside radiation patterns of a desired redundancy on the focal plane device. The relative interelement spacing between the transducers in a given array is generally set empirically to minimize sidelobe intensity between grating lobes of the radiation pattern antennas for a given parameter.

In one embodiment, the first and second transducer sets are disposed colinearly along the same edge of the acoustic wave device.

BRIEF DESCRIPTION OF THE DRAWINGS

FIG. 1 is a schematic diagram of a prior art one-dimensional acousto-optical signal processor.

FIG. 2 is a schematic block diagram of a prior art two-dimensional acousto-optic signal processor.

FIG. 3 (a) is a representation of the grating formed in the acoustic wave device 40 and the deflection in the focal plane 20 for a signal on boresight.

FIG. 3 (b) is a representation of the grating pattern in the acoustic wave device 40 and the deflection in the focal plane 20 for a signal off of boresight.

FIG. 4 is a representation of the focal plane signal deflection for three separate input frequencies in a 2D processor.

FIG. 9 is a graphical representation of the focal plane pattern for a 0 degree angle of arrival for the narrow aperture transducer array 1.

FIG. 10 is a graphical representation of the focal plane pattern for a 30 degree angle of arrival for the narrow aperture transducer array 1.

FIG. 13 is a graphical representation of the focal plane pattern for a 0 degree angle of arrival for transducer array 1 and a 30 degree angle of arrival for transducer array 2.

FIG. 14 is a graphical representation of the focal plane pattern for a 20 degree angle of arrival for transducer array 1 and a 30 degree angle of arrival for transducer array 2.

DETAILED DESCRIPTION OF THE PREFERRED EMBODIMENT

The present 3 or more—dimensional optical processor is based on the fact that different physical lengths of apertures for different tranducer sets will generate different-sized grating lobe patterns. Accordingly, it is possible to utilize for one parameter a first transducer set which has a narrow total length or aperture such that a non-redundant grating lobe is produced on the focal plane. Then for a second parameter a second transducer set is given a second larger total length or aperture to generate a redundant grating lobe pattern within this first grating lobe pattern. Each additional parameter to be extracted and sorted is then given a transducer set with a different total length in order to generate redundant grating lobes within the next larger grating lobe pattern. The different parameters are measured precisely, simply by finding the position of the grating lobe for that pattern which is closest to the centroid of the next larger lobe. The position of this centroid grating lobe relative to its position for a first parameter angle of arrival of 0 degrees is proportional to the first array parameter. Likewise, the position of the centroid for the larger lobe relative to its position for 0 degrees second parameter angle of arrival is proportional to the second parameter. The frequency parameter is, of course, determined by the relative vertical position of the large lobe along the frequency axis of the focal plane.

It should also be noted that the different parameters may also be measured to within a predetermined tolerance limit simply by finding the position of the maximum grating lobe in the entire composite pattern and determining the parameter value associated with the position for each subarray. The present invention will be disclosed in the context of a 3-dimensional processor, i.e., two angle of arrival direction parameters (azimuth and elevation) and the frequency parameter. Please note however, that the present design may be utilized to simultaneously process N dimensions, and these N dimensions can be formed by any instantaneous parameters which can be applied to the processor as a phase modulated signal.

Figure 5:
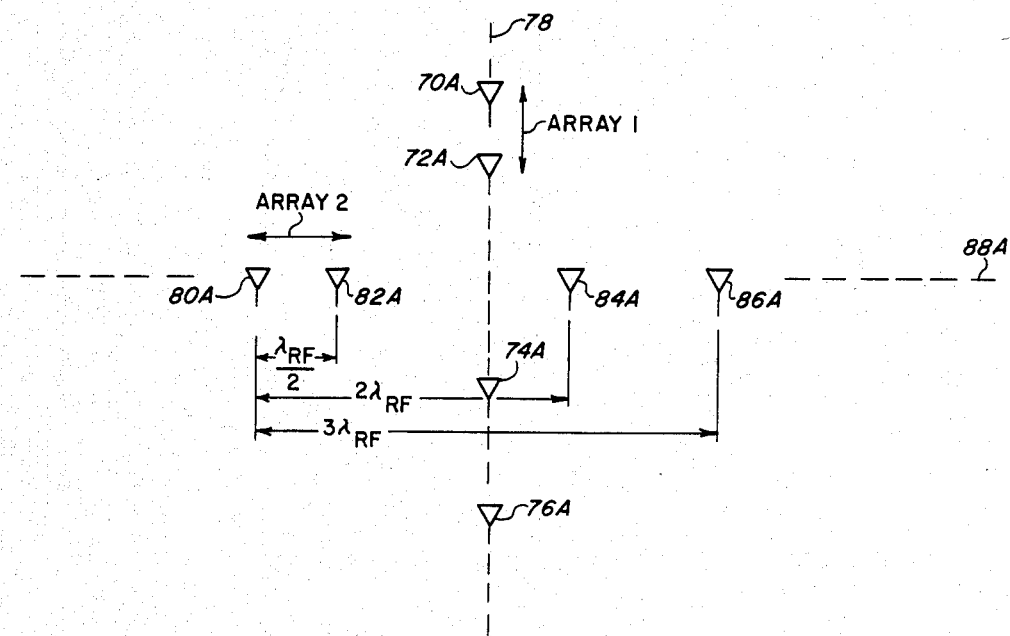
FIG. 5 is a schematic diagram illustrating two different RF antenna arrays, array 1 and array 2, disposed orthogonally with respect to each other.

Referring now to the figures, FIG. 5 sets forth a two array RF configuration, as an example, to illustrate the invention. An array 1 (elevation) is shown including antennas 70A, 72A, 74A, and 76A disposed in space on a vertical axis line 78. An array 2 (azimuth) is shown including antennas 80A, 82A, 84A, and 86A disposed in space on a line 88 which is orthogonal to the line 78. The spacings between the elements for each antenna array are generally set to obtain a specific RF beam pattern for that RF array, and will depend on the particular application intended for the array. The interelement spacing is generally determined empirically to provide a single response across the RF field of view a prescribed angular resolution (beamwidth), and minimum sidelobes. For additional discussion on RF antenna spacing design, see NRL Report No. 8782, entitled, "Acoustic Optical Direction Finding Optimal Four Element Linear Phased Arrays," by J. Sciortino. This report is hereby incorporated by reference into the Specification.

Note that the bearing resolution or boresight half-power beamwidth $\theta_L$ is determined by the physical length of the RF antenna array, i.e., $$\theta_L = 50\, \lambda_{RF}/L$$

where
$\lambda_{RF}$ = RF wavelength
L = array length or aperture i.e., the distance between the two outer elements in the antenna array.

Accordingly, the desired resolution or beamwidth determines the RF array length L. For a resolution or RF beamwidth of 10 degrees for array 2, a 3 $\lambda_{RF}$ spacing between the outer antenna elements 80 and 86 is required. Utilizing the design equations set forth in the above-referenced Sciortino Report, the spacing for the two inner RF antenna elements 82A and 84A is then determined as follows. For the example shown in FIG. 5 with a 10 degree beamwidth, the spacing between antennas 80A and 82A is one-half the RF wavelength, the spacing between antennas 80A and 84A is two RF wavelengths; and the array length spacing between antennas 80A and 86A is three RF wavelengths, as noted above. The interantenna element spacing for array 1, may be made identical to the spacing for RF array 2 for convenience of explanation, i.e., 70A-72A=$\lambda_{RF}/2$, 70A-74A=$2\lambda_{RF}$, and 70A-76A=$3\lambda_{RF}$. Please note again that the spacing is merely set forth by way of example.

Figure 15:
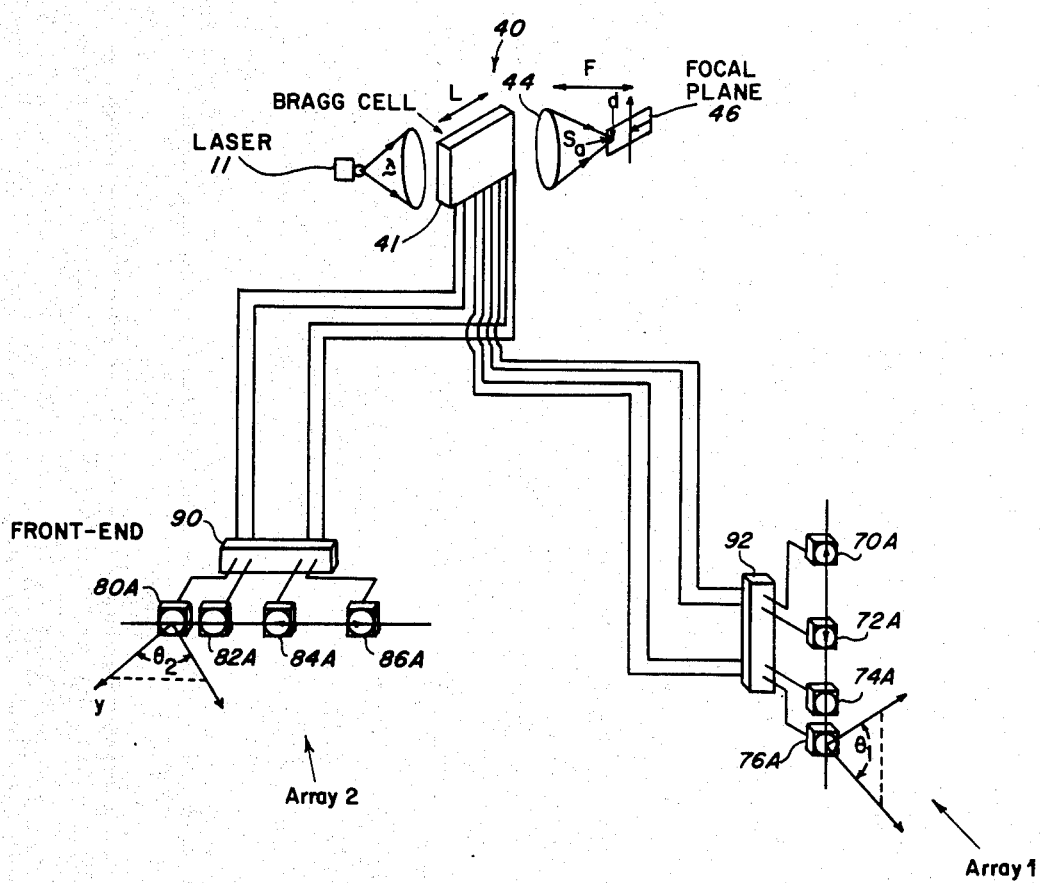
FIG. 15 is a schematic diagram of one embodiment of the present invention.

In order to perform simultaneous three dimensional optical analysis, the same system as shown in FIG. 2 is utilized, except that two different array sets of antennas (array 1 and array 2) are now applied to the front-end 38, and two different sets of acoustic transducers are disposed on the edges of the acoustic wave device 40, one for each antenna array set. FIG. 15 illustrates this configuration. A laser 11 again illuminates a Bragg acoustic wave device 40 at the Bragg angle, and a certain portion of the incident light is deflected and focussed via a lens 44 on to a focal plane 46. The antenna array 1 composed of antennas 70A, 72A, 74A, and 76A, drives one set of transducers (not shown) on and edge 41 of the acoustic wave device 40, while the antenna array 2, composed of the antennas 80A, 82A, 84A, and 86A, drives a second set of transducers (not shown) on an edge 41 of the acoustic wave device 40. The antenna signals from the antenna arrays 1 and 2 are applied to their respective transducer sets via a front end circuit, which is represented for convenience in FIG. 15 as the Front End circuits 90 and 92.

These acoustic transducers must be disposed in order to generate colinear and coplanar acoustic columns in the acoustic wave device 40. For example, the transducer sets could be disposed on opposite edges of the acoustic wave device 40. However, in a preferred embodiment, acoustic transducer sets may be disposed colinearly on one edge of the acoustic wave device 40.

As noted above, the present invention realizes simultaneous processing by generating a wide grating lobe for a first parameter set, and then generating redundant narrow grating lobes for a second parameter set within this wide grating lobe. The precise parameter information is obtained by measuring the position of a grating lobe for a parameter set relative to its boresight position for that parameter, i.e.. for bearing angle parameters, the boresight position indicates an angle of arrival of 0 degrees.

Accordingly, the beamwidth of an acoustically induced optical grating lobe in the focal plane and its redundancy must be varied for the different arrays. There are a number of methods available in the art for varying the beamwidth and its redundancy, including array length variation, and interelement spacing variation. However, in this case the same ratios are used for the spacings between the transducer elements in a given transducer array as are used for the spacings between the RF antenna elements used to drive that array, i.e. the acoustic transducer spacings within the transducer array are made directly proportional to the spacings between the RF antenna elements in the antenna array which is driving the transducer array. The transducer array with these spacing ratios can then be viewed as generating an optical phased-array transmission in a similar sense that the RF antenna array with those spacing ratios can generate an RF phased-array transmission.

Thus, the transducer interelement spacing ratios are viewed in this embodiment as a given. Accordingly, the total physical array length is varied in order to vary the beamwidth of the focal plane optical pattern and its redundancy.

The beamwidth in degrees may be determined from the equation $$\theta = 2 \sin^{-1}\left(\frac{2 S_i}{R}\right),$$

where $S_i$ is the number of pattern repetitions or redundancy in the focal plane, and R is the total number of pattern repetitions or redundancy in a 180 degree semicircular focal plane. The number of times R that a radiation pattern repeats on a semicircular focal plane is found to be equal to the total physical transducer array length L divided by the optical laser wavelength $\lambda_{light}$ (this number yields the number of optical wavelengths required to span the acoustic transducer array length L) divided by the unambiguous array length, which in the embodiment illustrated, is equal to the total transducer array length L divided by the smallest wavelength $\lambda_{trans}$ radiated by the transducers. "Unambiguous" means that the pattern does not repeat within the designated field of view. From the above, R can be represented by the following equation:

$$R = \frac{\text{Light Wavelengths Across Acoustic Transducer Array}}{\text{The Largest Unambiguous Array Length in Wavelengths}}$$

$$R = \frac{L}{\lambda_{LIGHT}} \cdot \frac{\lambda_{TRANS}}{L} = \frac{\lambda_{TRANS}}{\lambda_{LIGHT}} = \frac{\Lambda}{\lambda_{LIGHT} \cdot L'},$$

where $$\lambda_{TRANS} = \frac{\Lambda}{L'}$$

$\Lambda$ = Acoustic Wavelength In Meters
$L'$ = Largest Unambiguous Array Length in Wavelengths (design parameter)
$S_i$ is typically chosen to be 1 so that the beamwidth angle for a single lobe is determined.

Figure 6:
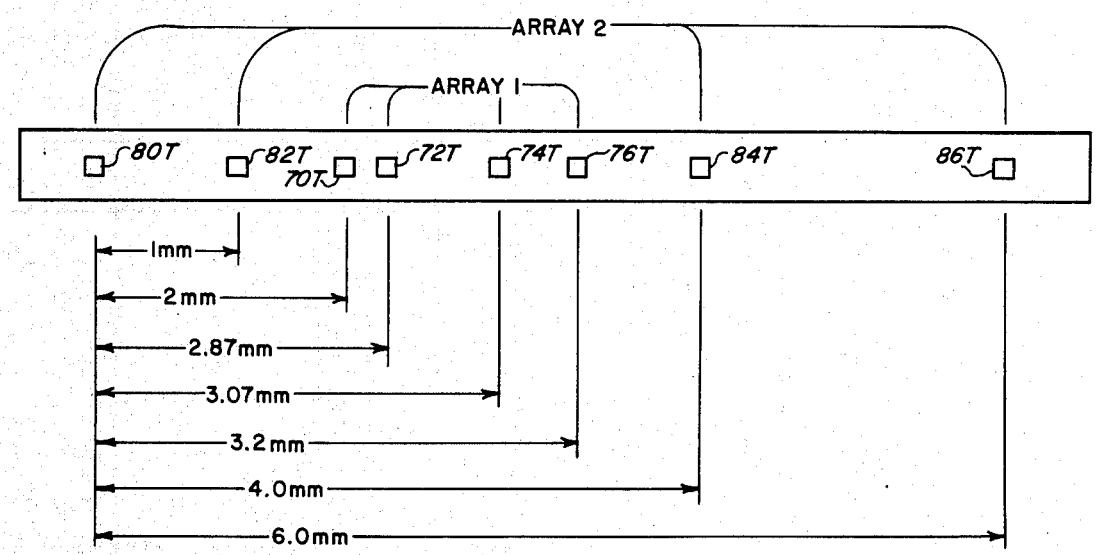
FIG. 6 is a schematic diagram of the transducer spacings to form a transducer array 1 and a transducer array 2 on an acoustic wave device to be used in the present invention.

FIG. 6 sets forth, by way of example, the transducer array lengths and spacings that could be used to implement one embodiment of the present invention. FIG. 6 shows a transducer array 1 which is to be driven by the RF antenna array 1 shown in FIG. 5, and a transducer array 2 which is to be driven by the RF antenna array 2 in FIG. 5. Transducer array 1 comprises a set of four transducers 70T, 72T, 74T, and 76T. Each transducer number corresponds to the number of the antenna element which is driving that transducer, with the suffix T designating that it is a transducer. Note that the transducer interelement spacings for transducer array 1 are directly proportional to the interelement spacings for antenna array 1, i.e., 70A–72A α 70T–72T, 70A–74A α 70T–74T, etc. The direct proportionality between transducer and antenna spacings, i.e.

$$\frac{70A-72A}{70T-72T} = \frac{70A-74A}{70T-74T} \ldots = k$$

also holds for transducer array 2 and antenna array 2.

With the interelement spacing ratios for the transducers being set as noted above, then the beamwidth of the array-induced focal plane patterns and the redundancy is directly related to the physical length or aperture of each array. In the example of FIG. 6, assume an overall Bragg cell 40 width of 6 mm. This Bragg cell width aperture places a limit on the length of the wide array 2. Thus, assume that the wide aperture array 2 has a physical length L of 6 mm. Further, assume that the antenna spacing shown in FIG. 5 yields an RF beamwidth of 10° (RF angular resolution). The angular displacement between grating lobes $\theta_2$ for the wide aperture array 2 is then determined as follows for $S_i = 1$:

Array Length (L) $6 \times 10^{-3}$ meters
Acoustic Velocity ($V_a$) $3 \times 10^3$ meters/sec
Light Wavelength ($\lambda_{light}$) $10^{-9}$ meters
Largest Unambiguous Array Length (L') 3
Acoustic/RF Frequency $10^9$ Hz $$\Lambda = 3 \times 10^3/10^9 = 3 \times 10^{-6}$$

$$R = 3 \times 10^{-6}/(10^{-9})(3) = 10^3$$

$$\theta_2 = 2 \sin^{-1} \frac{2 \cdot S_i}{R} = 2 \sin \frac{2 \cdot 1}{10^3} = 0.23°$$

Thus, the spatial angle $\theta_2 = 0.23°$ is the grating lobe period for array 2. Multiplexing is obtained using a design that places at least one array 2 lobe within the wider lobe created by array 1. (The array 2 focal plane grating lobes are spaced no more than every 0.23 degrees (equivalent to 10 degrees in the RF antenna pattern) on the pattern generated from the narrow-spaced array 1 wide-lobe pattern.

The spatial parameters of the wide lobe beamwidth of array 1 can be calculated from focal plane grating lobe period ratios. The ratio between the spatial characteristics of array 1 and array 2 may be derived from the relative grating lobe period of the array 2 pattern within the array 1 pattern. Since the array 2 period is designed to occupy 10 degree segmentation of the array 1 360° period, the ratio (k) defining the interelationship between the spatial characteristics of the two arrays is given by:

$$K = 360/10 \text{ degrees} = 36°$$

The equivalent grating lobe period of array 1 ($\theta_1$) is given by:

$$\theta_1 = \frac{180}{10} \cdot \theta_2 = (18) \cdot (.23 \text{ degrees}) = 4.14°.$$

If the beamwidth for the narrow aperture array 1 is 16.56 degrees, then the narrow aperture length $L_1$, can be calculated as follows:

$$L_1 = \frac{L_2}{k} = \frac{6 \times 10^{-3}}{18} = .32 \text{ mn}$$

The array lengths and transducer interelement spacings shown in FIG. 6 are representative of the numbers calculated above (i.e. $L_1 = 0.4$ mn).

The focal plane responses for the arrays set out in FIG. 6 are shown in FIGS. 7-14.

Figure 7:
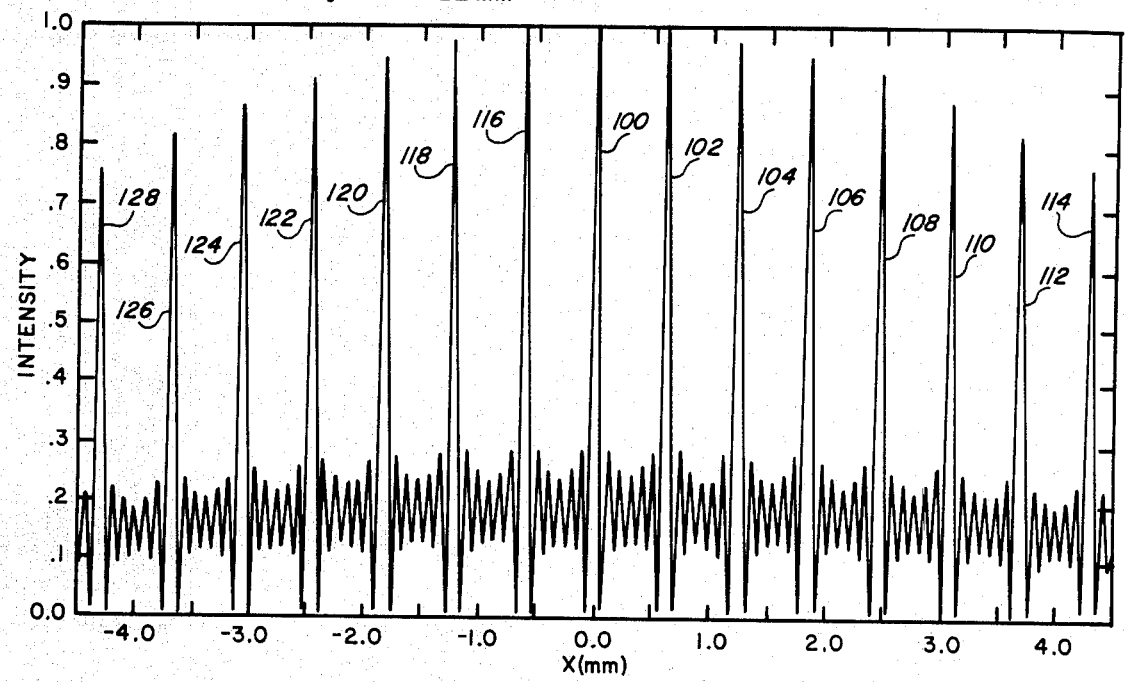
FIG. 7 is an graphical representation of the focal plane pattern for a 0 degree angle of arrival for wide aperture transducer array 2.

FIG. 7 is a graphical representation of the focal plane response of array 2, the wide aperture array, for an angle of arrival of 0 degrees for a transducer width of 0.04 mm, an optical wavelength of 0.00082 mm, and an acoustic wavelength of 0.00122 mm. These parameters are the same for FIGS. 8-14. Note that the width of the lobes 100-120 in FIG. 7 corresponds to 10 degrees in the RF pattern. Also note that the location of any of the large lobes 100-128 corresponds to the 0 degree boresight angle of arrival.

Figure 8:
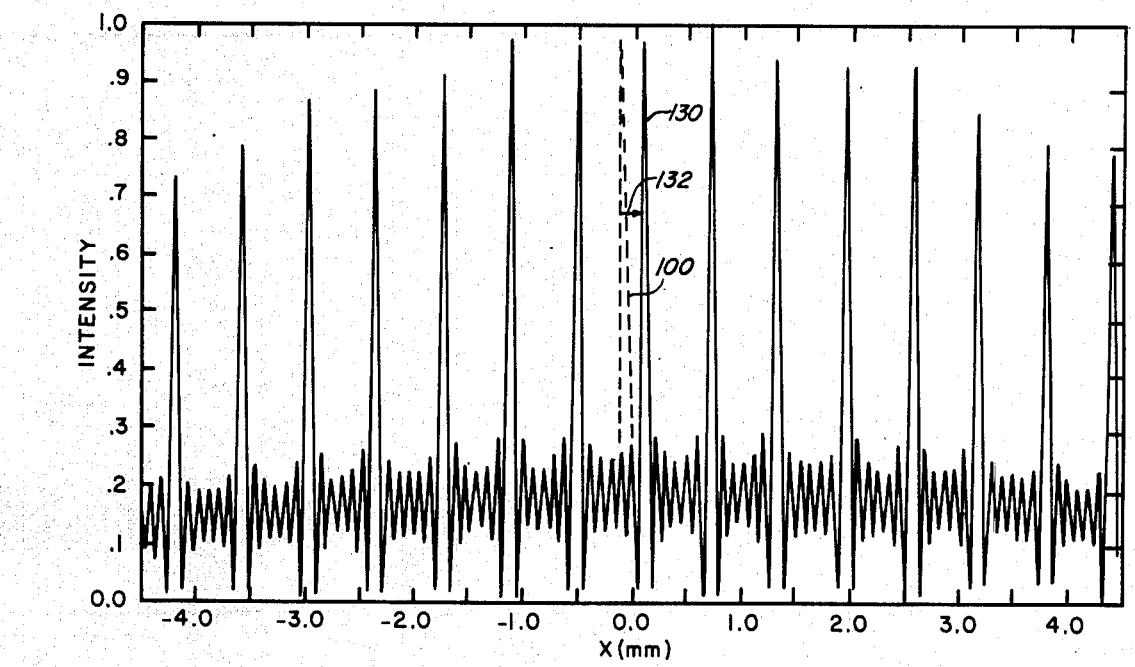
FIG. 8 is a graphical representation of the focal plane pattern for a 20 degree angle of arrival for wide aperture transducer array 2.

FIG. 8 shows the focal plane response for a wide aperture array 2 for an angle of arrival of 20 degrees off of boresight. Note that all of the grating lobes 130 are shifted to the right relative to the lobes 100-128 shown in FIG. 7. Grating lobe 100 from FIG. 7 is reproduced in dashed lines in FIG. 8 for purposes of comparison. This location difference 132 for the grating lobes corresponds to 20 degrees off of boresight for the angle of arrival to the RF array 2.

FIG. 9 shows the response on the focal plane for the narrow aperture array 1 for an angle of arrival of 0 degrees to RF array 1. Thus, the position of the main lobe 140 is the boresight position, and the half-power beamwidth for lobe 140 corresponds to 10 degrees in the RF array 1 pattern (the orthogonal antenna array to antenna array 2).

FIG. 10 shows the response on the focal plane of the narrow aperture array 1 for an angle of arrival of 30 degrees. The position of the main lobe 142 has moved to the right relative to the boresight position of mainlobe 140. The position difference 144 between these two lobes 140 and 142 corresponds to a 30 degree angle of arrival off of boresight to the RF antenna array 1.

Figure 11:
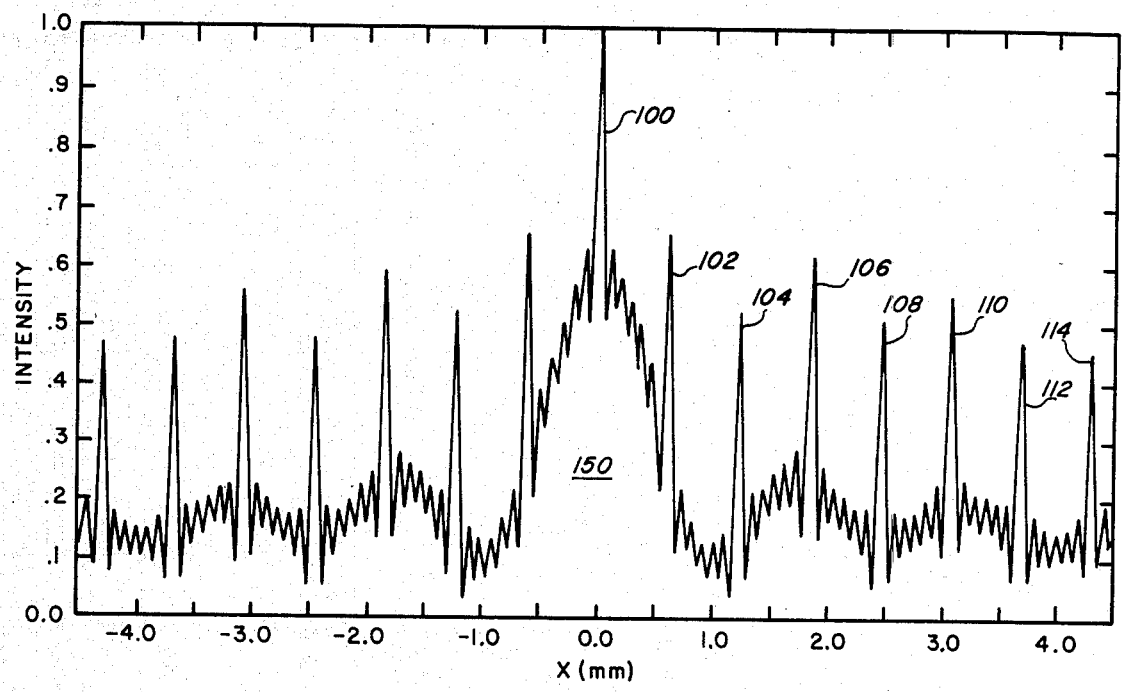
FIG. 11 is a graphical representation of the focal plane pattern for the incoherent sum for a 0 degree angle of arrival for the multiplexed signals of both transducer array 1 and transducer array 2.

FIG. 11 shows the multiplexed response on the focal plane for both transducer arrays 1 and 2, for an angle of arrival of 0 degrees for array 1, and 0 degrees for array 2. Note that the main lobe 150 corresponds to the wide main lobe for the narrow aperture array 1, while the peak 100 corresponds to the grating lobe 100 in FIG. 7 for the wide aperture array 2.

Figure 12:
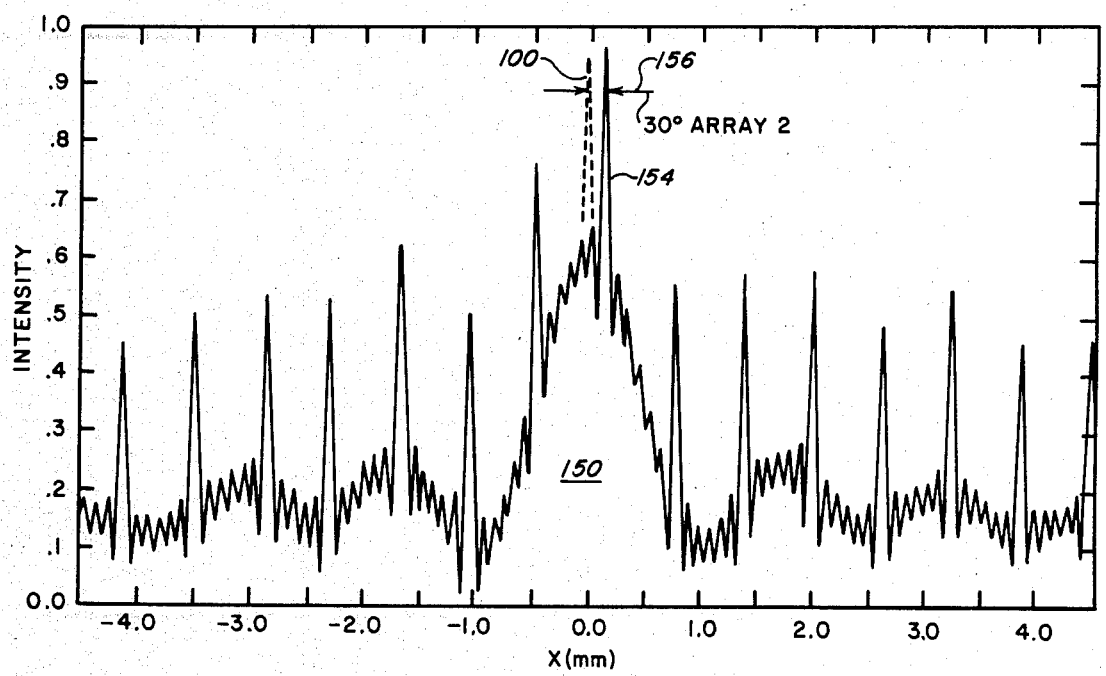
FIG. 12 is a graphical representation of the focal plane pattern for a 30 degree angle of arrival for transducer array 2 and a 0 degree angle of arrival for transducer array 1.

FIG. 12 shows the multiplexed response on the focal plane for both transducer arrays for an angle of arrival of 0 degrees for the narrow-aperture wide-lobe array 1 and an angle of arrival of 30 degrees for the wide-aperture narrow-lobe array 2. Note that the wide main lobe 150 for both FIG. 11 and FIG. 12 is in the same position indicating a 0 degree angle of arrival for that parameter. However, the grating lobe 154 disposed on the main lobe 150 has moved from the boresight position 100 shown in FIG. 11. This position difference 156 between the boresight position 100 shown in FIGS. 7 and 11 and the new position 154 corresponds to 30 degrees off of boresight for a target in RF array 2.

FIG. 13 shows the multiplexed response on the focal plane for both transducer arrays for an angle of arrival of 30 degrees for the narrow-aperture wide-lobe array 1 and an angle of arrival of 0 degrees for the wide-aperture narrow-lobe array 2. Note that the wide main lobe 158 has moved to a new position relative to the boresight position 150 shown in FIG. 11. The difference in position between these two main lobes as measured from their centroids corresponds to an angle of 30 degrees off of boresight in the RF antenna array 1 pattern. Note that the position of grating lobe 108 for the wide aperture small-lobe array 2 shown in FIG. 13 corresponds exactly to the position of the grating lobe 108 in FIG. 11 and FIG. 7, thus indicating a 0 degree angle of arrival in the pattern of RF array 2.

FIG. 14 shows the multiplexed response on the focal plane for both transducer arrays for a target angle of arrival of 30 degrees for the narrow-aperture wide-lobe array 1 and an angle of arrival of 20 degrees for the wide-aperture narrow-lobe array 2. The large main lobe 162 has moved to a new position relative to the boresight position 150 shown in FIG. 11. The difference in position between these two main lobes as measured from their centroids corresponds to a target 30 degrees off of boresight in the RF antenna array 1 pattern. The small grating lobe 164 on this main lobe 162 has moved to a new position relative to the boresight position 108 shown in FIG. 7 and FIG. 11. This position difference between these two grating lobe corresponds to a target 20 degrees off of boresight in RF antenna array pattern 2.

Note that since main lobe 162 and grating lobe 164 in FIG. 14 both correspond to 10 degrees in their respective driving RF antenna patterns, the wide main lobe from narrow-aperture array 1 is resolved to a coarser resolution in the focal plane than the narrow lobe from wide-aperture array 2.

From the above, it is seen that information can be processed for two different bearing angles in addition to obtaining a frequency analysis. All of this information is obtained from a single focal plane pattern. This multiplexing is effected through the use of transducer array design. Specifically, one parameter is imaged on a focal plane non-redundantly (i.e., approximately one main lobe) on a given axis. Then a second parameter is imaged redundantly within the main lobe of this nonredundant pattern on the same axis. The number of redundant grating lobes for the second parameter within the wide-lobe pattern is determined by the resolution requirements for the system. However there should be two repetitions of the second parameter pattern within the main lobe of the first parameter for proper Nyquist sampling.

This optical processor design can be expanded to include the instantaneous analysis of N simultaneous signal parameters simply by adding additional acoustic transducer arrays of different array apertures. These different transducer array apertures generate different sized beamwidths and grating lobe redundancies. In the general case, each additional parameter to be extracted is simply given a transducer set with a larger total array aperture than the previous parameter so that it will generate redundant grating lobes within the wider grating lobe pattern of that previous parameter. In essence, the optical pattern for each new parameter is simply superimposed on the other patterns on the focal plane.

Although the present invention does not deal with the processing of this signal, the processing therefor is standard. In order to measure the position of the wide main lobe of the narrow aperture array 1 relative to its boresight position for each frequency line in the focal plane 40, the signals from the photosensor elements on each frequency line can be filtered by a low pass filter to remove all of the small grating lobes on the large main lobe. A comparison of the voltage amplitudes for each photosensor in the line of photosensor elements can then be used to determine the position of the centroid for the main lobe. This centroid position can then be compared to the boresight position to determine the angle of arrival for the array 1 bearing parameter. In this regard, the boresight position for the main lobe can simply be held in a memory and applied to one input of a comparator with the centroid position being applied to the other input of the comparator.

In order to obtain the array 2 parameter, the unfiltered (so that the grating lobes are still on the mainlobe signals) voltage amplitudes for the line of photosensor elements are compared to determine the location of the grating lobe closest to the centroid of the main lobe. This grating lobe position is then measured relative to the boresight null position for that particular grating lobe in order to determine the angle of arrival for the array 2 bearing parameter. The boresight position again may simply be held in memory and applied to one input of a comparator with the grating lobe position applied to the other input of the comparator. This procedure can clearly be stretched N times in order to simultaneously analyze N-1 parameters in conjunction with frequency. The frequency of the emitter is determined simply by measuring the position of the main lobe along the vertical frequency axis of the focal plane.

A number of other signal processing techniques are applicable to the extraction of parametric data from the focal plane array. The approach presented here is an example of one technique for data parameterization.

With respect to the photosensor elements required in the focal plane 40, the number of photosensor elements Y required on the vertical axis of the focal plane 46 in order to obtain proper Nyquist sampling resolution for a given set of pattern quantization levels is $$Y = 2 \cdot Q_1 \cdot Q_2,$$

where $Q_1$ is the number of quantization levels required for a first parameter, and $Q_2$ is the number of quantization levels required for a second parameter.

The number of photosensor elements required in the horizontal axis of the focal plane 46 is merely the frequency parameter quantization level.

It should be noted that the front end 38 for the system may include an IF converter in order to heterodyne incoming antenna RF signals to a convenient intermediate frequency for the acoustic wave device 40. Since RF signal analysis can be required anywhere in the RF or microwave frequency range, conversion may be either up or down conversion in frequency to the acoustic transducer range.

It should be noted that the amplitude pattern for the grating lobes in the focal plane depends on the width of the acoustic column illumination from the laser. Also, the larger physically that the transducer elements are made in width, the narrower the acoustic column for a given transducer In order to cover a wide frequency bandwidth, a certain minimum acoustic column width is required for the individual columns so that Bragg deflection is obtained over a range of frequencies. This minimum acoustic column is a function of the acoustic wave device material and the frequency range involved. For further information on this point see *Acousto-optics* by J. Sapriel, John Wiley & Sons, 1976.

Note also that a holographic lens may be inserted between the laser 11 and the acoustic wave device 40 in order to focus the laser beam into narrow light beams in order to illuminate only the acoustic columns set up by the transducers in the acoustic wave device 40. Such a lens would increase the efficiency of the device.

There are a number of significant advantages which arise from the use of multidimensional instantaneous signal processors including significantly smaller size, better performance, and lower cost of implementation. More specifically, the equipment volume is expected to be the same size as would be required to measure a single parameter conventionally. Since multiple simultaneous parameter measurements are performed, the size advantage based upon the equivalent conventional circuit is approximately the number of simultaneous parameters to be measured. Moreover, the performance advantage from the use of optical circuits corresponds to an equivalent advantage over conventional technology. The potential cost advantage arises from the need for only one processing device.

The Multi-Dimensional Optical Processor of the present invention can be fabricated in several materials systems. Within the current state of the art, Lithium Niobate is the preferred substrate material for many electronic warfare applications. However, other materials such as Tellurium Dioxide and Gallium Arsenide, flint glass, and quartz can be used. Parameter measurements that can be made include any parameters which can be expressed as signal phase, such as frequency, direction, elevation, phase, polarization. Data can also be modulated onto a carrier and analyzed within the optical processor.

The present invention has been described in the context of an acousto-optic receiver system. However, it should be noted that other Bragg effect interaction devices can be utilized including photographic plates, magneto-statics, photodichroics, light valves, Titus, and photo titus tubes, and liquid crystal modulators.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A three or more dimensional instantaneous optical signal processor, comprising:
   means for providing at least a first parameter set of input signals and a second parameter set of input signals from a signal emitter at intermediate frequencies;
   a focal plane with a first axis and a second axis perpendicular thereto;
   means for generating a first light pattern representing said first parameter set on said focal plane, said first light pattern having a mainlobe with a centroid, with the distance between the location of the mainlobe for the pattern and the first axis of the focal plane being proportional to the frequency of said signal emitter, and with the distance between the location of the mainlobe and a second axis in said focal plane perpendicular to said first axis being proportional to said first parameter of said signal emitter; and
   means for generating a second light pattern redundantly within said first light pattern representing said second parameter in said focal plane to thereby form a plurality of grating lobes thereon, with the distance between the location of the grating lobe in this second light pattern closest to the centroid of said first light pattern and a second pattern null boresight reference position being proportional to said second parameter.

2. An N-dimensional instantaneous optical signal processor comprising:
   means for providing N-1 parameter sets of input signals at intermediate frequencies;
   a focal plane device;
   a modulating apparatus for modulating the information from said N-1 parameter sets onto coherent light and summing this modulated light on said focal plane device, said modulating apparatus comprising N-1 modulating and imaging means including
   first modulating and imaging means for modulating a first parameter set of said N-1 parameter sets and imaging it in the form of a first pattern on said focal plane device;
   second modulating and imaging means for modulating a second parameter of said N-1 parameter sets and imaging it redundantly in the form of a second pattern within the first pattern on said focal plane device; and
   N-3 modulating and imaging means, with an nth modulating and imaging means for modulating an nth parameters set of said N-1 parameter sets and imaging it redundantly in the form of an nth pattern within the N-1 th pattern on said focal plane device, where $3 \leq n \leq N-1$.

3. An optical signal processor as defined in claim 2, wherein said first modulating and imaging means includes means for imaging said first pattern non-redundantly on said focal plane device.

4. An optical signal processor as defined in claim 2, wherein said modulating apparatus comprises:
   an essentially optically transparent acoustic wave device; and
   means for applying coherent light to said acoustic wave device at approximately the Bragg angle such that a portion of said coherent light is deflected onto the said focal plane device at an angle proportional to the applied frequency propagating within said acoustic wave device.

5. An optical signal processor as defined in claim 4, wherein each of said N-1 modulating and imaging means comprise a set of transducers disposed linearly on an edge of said acoustic wave device for generating an optical diffraction grating in said acoustic wave device by propagating acoustic waves therein, said each set of transducers being driven by a different predetermined input signal set from said N-1 parameter sets, each set of transducers having a predetermined array aperture for generating a broadside radiation pattern of a desired redundancy on said focal plane device.

6. An optical signal processor as defined in claim 5, wherein said means for providing N-1 sets of input signals comprises means for providing array signals from at least two antenna arrays.

7. An optical signal processor as defined in claim 6, wherein said means for providing array signals from at least two antenna arrays comprise means for obtaining a set of first antenna array signals from a first antenna array with a specific first interelement spacing ratio between antennas in this first antenna array, and means for obtaining a set of second antenna array signals from asecond antenna array with a specific second interelement spacing between antennas in this second antenna array; and
   wherein a first set of transducers from said N-1 sets of transducers is driven by said set of first antenna array signals and has the same interelement spacing ratios between transducers as said first antenna interelement spacing ratios, and wherein a second set of transducers from said N-1 sets of transducers is driven by said set of second antenna array signals and has the same interelement spacing ratios between transducers as said second antenna interelement spacing ratios.

8. An optical signal processor as defined in claim 7, wherein said acoustic wave device is planar in shape and said N-1 transducer sets are disposed to generate propagating parallel coplanar waves in said acoustic wave device.

9. An optical signal processor as defined in claim 8, wherein said focal plane device comprises a planar array of optical detectors.

10. An optical signal processor as defined in claim 9, wherein said coherent light applying means comprises a laser.

11. An optical signal processor as defined in claim 10, wherein said N-1 transducer sets are disposed colinearly on one edge of said acoustic wave device.

12. A three-dimensional instantaneous optical signal processor comprising:
   means for providing at least two sets of input signals at intermediate frequencies;
   an essentially optically transparent acoustic wave device:
   a focal plane device;
   means for applying coherent light to said acoustic wave device at approximately the Bragg angle such that a portion of said coherent light is deflected on to said focal plane device at an angle proportional to the applied frequency;

a first set of transducers disposed on one edge of said acoustic wave device for generating an optical diffraction grating in said acoustic wave device by propagating acoustic waves therein, each transducer from said first set of transducers being driven by a different signal from one of said at least two sets of input signals, said first transducer set having a predetermined set of spacing ratios between transducers, said first transducer set having a first predetermined array aperture for generating a first broadside radiation pattern on said focal plane device no part of which repeats in said focal plane;

a second set of transducers disposed on said one edge of said acoustic wave device for generating an optical diffraction grating in said acoustic wave device, each transducer from said second set of transducers being driven by a different signal from another one of said at least two sets of input signals, said second transducer set having a second predetermined set of spacing ratios between transducers, said second transducer set having a second predetermined array aperture which is larger than said first predetermined array aperture for generating a second broadside radiation pattern which repeats itself within said first radiation pattern on said focal plane.

13. An optical signal processor as defined in claim 12, wherein said first and second transducer sets are disposed colinearly along the same edge of said acoustic wave device.

14. An optical signal processor as defined in claim 12, wherein said at least two sets of signals comprise a set of first antenna array signals from a first antenna array with specific first interelement spacing ratios between antennas in this first antenna array, and a set of second antenna array signals from a second antenna array with specific second interelement spacing ratios between antennas in this second antenna array; and wherein said first set of transducers is driven by said set of first antenna array signals and has the same interelement spacing ratios between transducers as said first interelement spacing ratios, and wherein said second set of transducers is driven by said set of second antenna array signals and has the same interelement spacing ratios between transducers as said second interelement spacing ratios.

15. An optical signal processor as defined in claim 14, wherein said set of first antenna array signals are generated from an azimuth antenna array, and said set of second antenna array signals are generated from an elevation antenna array.

16. A method for instantaneously processing three or more signal parameters simultaneously, comprising the steps of:

providing N-1 parameter sets of input signals at appropriate intermediate frequencies;

generating a first light pattern representing a first parameter set from said N-1 parameter sets on a focal plane with said first light pattern having a mainlobe with a centroid, with the distance between the location of the mainlobe for the pattern and a first axis of the focal plane being proportional to the frequency of said signal emitter, and with the distance between the location of the mainlobe and a second axis in said focal plane perpendicular to said first axis being proportional to said first parameter of said signal emitter; and generating a second light pattern representing a second parameter of said N-1 parameters redundantly within said first light pattern in sid focal plane to thereby form a plurality of grating lobes, with the distance between the location of the grating lobe in this second light pattern closest to the centroid of said first light pattern and a second null boresight reference position being proportional to said second parameter; and generating N-3 light patterns, with an n th light pattern thereof representing an n th parameter from sai N-1 parameters redundantly within the n-1th pattern in said focal plane, to thereby form a plurality of grating lobes with each such grating lobe having a centroid, with the distance between the location of the grating lobe in this n th light pattern closest to the centroid of the n-1th light pattern and an n th null boresight reference position, being proportional to said nth parameter, where $3 \leq n \leq N-1$.

* * * * *